United States Patent
Agrawal et al.

(10) Patent No.: US 12,339,776 B1
(45) Date of Patent: Jun. 24, 2025

(54) ZERO VALUE MEMORY ACCESS OPTIMIZATION

(71) Applicant: Advanced Micro Devices, Inc., Santa Clara, CA (US)

(72) Inventors: Varun Agrawal, Westford, MA (US); Georgios Tziantzioulis, Belmont, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/392,153

(22) Filed: Dec. 21, 2023

(51) Int. Cl.
  *G06F 12/0811* (2016.01)
  *G06F 9/32* (2018.01)
  *G06F 12/0864* (2016.01)

(52) U.S. Cl.
  CPC .......... *G06F 12/0811* (2013.01); *G06F 9/321* (2013.01); *G06F 12/0864* (2013.01)

(58) Field of Classification Search
  CPC ... G06F 12/0811; G06F 9/321; G06F 12/0864
  See application file for complete search history.

(56) References Cited

U.S. PATENT DOCUMENTS

| | | | |
|---|---|---|---|
| 2004/0133748 A1* | 7/2004 | Yang | G06F 12/0817 711/E12.027 |
| 2005/0160234 A1* | 7/2005 | Newburn | G06F 12/0864 711/144 |
| 2008/0288436 A1* | 11/2008 | Priya N V | G06F 12/0246 706/48 |
| 2014/0108740 A1* | 4/2014 | Rafacz | G06F 12/0862 711/137 |
| 2022/0129385 A1* | 4/2022 | Karve | G06F 12/0862 |

* cited by examiner

*Primary Examiner* — Gurtej Bansal
(74) *Attorney, Agent, or Firm* — FIG. 1 Patents

(57) ABSTRACT

In accordance with the described techniques, a device includes a memory system and a processor communicatively coupled to the memory system. The processor receives a load instruction from the memory system instructing the processor to load data associated with an address. In response, the processor performs a lookup for the address in a bloom filter that tracks zero value cache lines that have previously been accessed. Based on the lookup indicating that a hash of the address is present in the bloom filter, the processor generates zero value data. Furthermore, the processor processes one or more dependent instructions using the zero value data.

20 Claims, 5 Drawing Sheets

500

502
Implement a speculative load policy by which dependent instructions that depend on load instructions predicted to access zero value cache lines are processed using zero values

504
Transition to a baseline load policy by which the load instructions are processed based on retrieval of cache lines from memory based on one or more of an opportunity value falling below an opportunity threshold, a coverage value falling below a coverage threshold, and an accuracy value falling below an accuracy threshold

FIG. 5

ZERO VALUE MEMORY ACCESS OPTIMIZATION

BACKGROUND

Processors, such as central processing units and graphics processing units, are tasked with processing ever-increasing amounts of data. Access to this data is a significant factor in the speed, at which, the processor is able to process the data. Processors typically access data using load operations, which load data from a memory resource (e.g., caches, volatile memory, or non-volatile memory) for execution by the processor. Many applications, such as graph analytics applications, utilize frequent accesses to zero values in memory, which involves performing load operations on zero value cache lines.

BRIEF DESCRIPTION OF THE DRAWINGS

FIG. 5 depicts a procedure in an example implementation of zero value memory access optimization.

DETAILED DESCRIPTION

Overview

Figure 1:
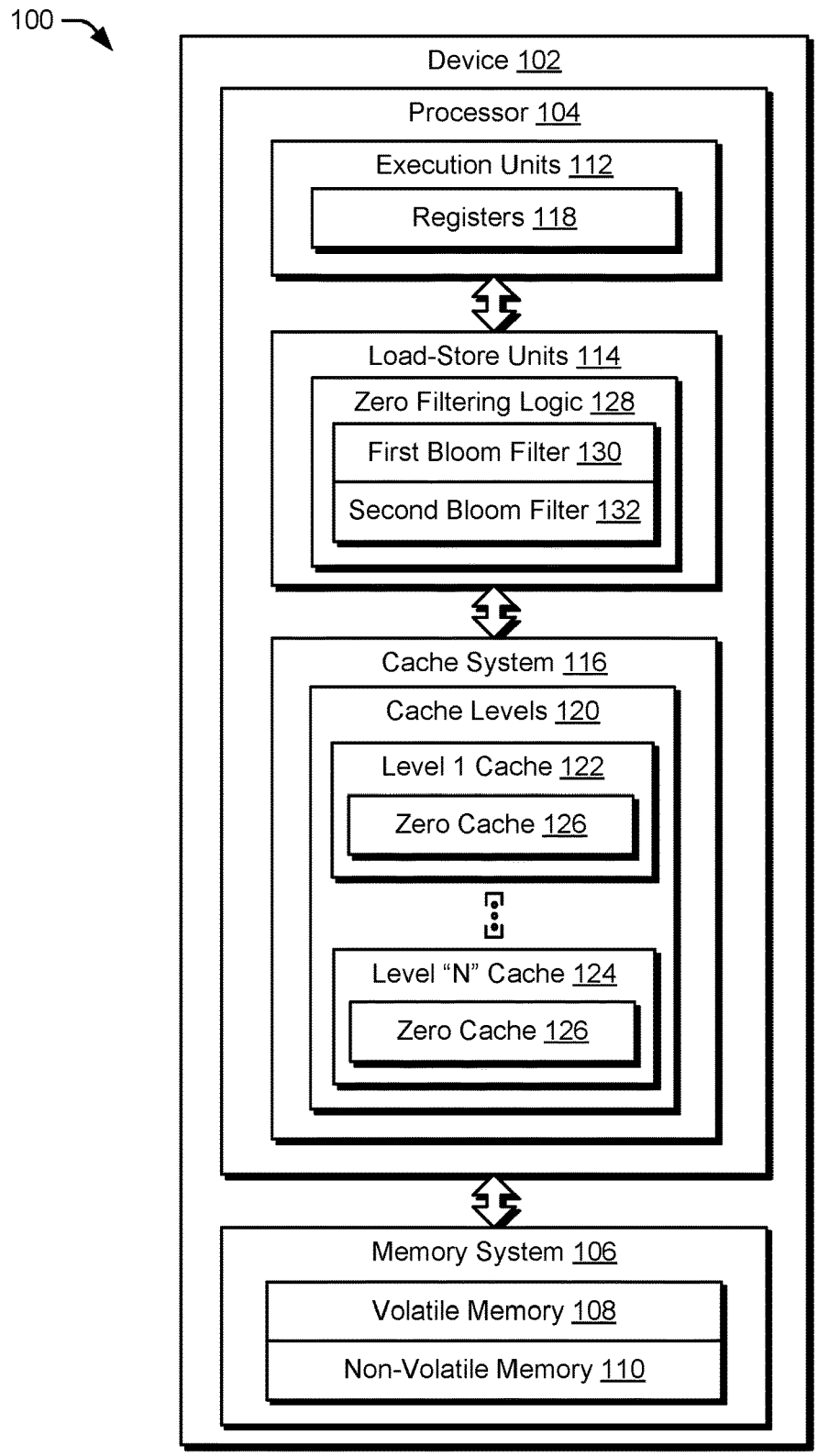
FIG. 1 is a block diagram of a non-limiting example system to implement zero value memory access optimization.

A system includes a processor communicatively coupled to a memory system. The processor includes one or more execution units, one or more load-store units, and a cache system having multiple cache levels. Further, the memory system includes a volatile memory and a non-volatile memory. Broadly, the load-store unit is configured to receive a load instruction that includes an address, and obtain data associated with the address. In accordance with a baseline lookup protocol, the load-store unit performs the load operation by progressively looking up the address in successive cache levels of the cache system, then the volatile memory, then the non-volatile memory. Once the load-store unit identifies a memory resource that includes the data associated with the address, the load-store unit loads the data for processing by the execution unit.

Certain applications frequently read zero value data from memory, e.g., the cache system or the memory system. That is, these applications often access zero value cache lines (e.g., cache lines having all zero values), including accesses to zero value cache lines that have previously been accessed. Despite frequent repeated accesses to zero value cache lines, conventional techniques rely on loading data from the cache system or the memory system (e.g., in case of a cache miss), before determining that the loaded data includes solely zero values. Accordingly, dependent instructions that rely on the data of the load instruction stall until the zero value data is loaded. These conventional techniques, therefore, incur significant data load latency in loading previously accessed zero value cache lines that likely still include solely zero values.

In accordance with the described techniques, the load-store unit includes zero filtering logic. One example of this logic involves the use of one or more bloom filters. For instance, a first bloom filter includes hashes of addresses to cache lines that have previously been accessed, and a second bloom filter includes hashes of addresses to zero value cache lines that have previously been accessed. In response to receiving a load instruction associated with an address, the load-store unit performs a lookup for the address in the bloom filters. Further, the zero filtering logic predicts that the load instruction accesses a zero value cache line based on a hash of the address being present in both the first bloom filter and the second bloom filter.

Furthermore, the load-store unit is configured to implement a speculative load protocol based, in part, on the prediction that the load instruction accesses the zero value cache line. As part of the speculative load protocol, the load-store unit generates zero value data (e.g., before identifying the data associated with the address in the cache system or the memory system), and loads the zero value data into registers of the execution unit. Moreover, the execution unit executes one or more dependent instructions that rely on data obtained as a result of processing the load instruction using the zero value data, e.g., rather than a cache line obtained from the cache system or the memory system. Thus, in scenarios in which the zero filtering logic accurately predicts that a load instruction accesses a zero value cache line, the described techniques reduce data load latency in comparison to conventional techniques, which also improves overall computer performance.

In some aspects, the techniques described herein relate to a device, comprising a memory system, and a processor communicatively coupled to the memory system, the processor configured to perform operations, including receiving a load instruction from the memory system instructing the processor to load data associated with an address, performing a lookup for the address in a bloom filter that tracks zero value cache lines that have previously been accessed, and generating zero value data based on the lookup indicating that a hash of the address is present in the bloom filter, the zero value data being used by the processor to process one or more dependent instructions.

In some aspects, the techniques described herein relate to a device, wherein the processor includes a cache system including multiple cache levels, each cache level including a non-zero cache storing cache lines that include non-zero values, and a zero cache storing indications of the zero value cache lines.

In some aspects, the techniques described herein relate to a device, wherein generating the zero value data includes performing an additional lookup for the address in a first cache level of the cache system based on the address being present in the bloom filter, and generating the zero value data based on the hash of the address being present in the bloom filter and a tag of the address being absent from the first cache level.

In some aspects, the techniques described herein relate to a device, the operations further including performing an additional lookup for the address in a first cache level of the cache system based on the address being present in the bloom filter, and loading a cache line from the first cache level based on the hash of the address being present in the bloom filter and a tag of the address being present in the first cache level, the cache line being used by the processor to process the one or more dependent instructions.

In some aspects, the techniques described herein relate to a device, the operations further including loading a cache line from the cache system or the memory system based on the hash of the address being absent from the bloom filter, the cache line being used by the processor to process the one or more dependent instructions.

In some aspects, the techniques described herein relate to a device, the operations further including loading a cache line from the cache system or the memory system based on the hash of the address being present in the bloom filter, and re-processing the one or more dependent instructions using the cache line rather than the zero value data based on a portion of the cache line including non-zero values.

In some aspects, the techniques described herein relate to a device, the operations further including deleting an indication of the cache line from the bloom filter based on the cache line including non-zero values.

In some aspects, the techniques described herein relate to a device, the operations further including performing an additional lookup for the address in an additional bloom filter that tracks cache lines that have previously been accessed, the zero value data being generated based on the lookup indicating that the hash of the address is present in the bloom filter and the additional lookup indicating that the hash of the address is present in the additional bloom filter.

In some aspects, the techniques described herein relate to a device, the operations further including maintaining a first counter of a first number of load instructions that are predicted as accessing the zero value cache lines based on the bloom filter, maintaining a second counter of a second number of load instructions that have accessed the zero value cache lines in memory, and maintaining a third counter of a third number of load instructions that are correctly predicted as accessing the zero value cache lines based on the bloom filter.

In some aspects, the techniques described herein relate to a device, the operations further including calculating an opportunity value based on a comparison of the second number of load instructions to a total number of load instructions received, the lookup being performed based on the opportunity value satisfying a threshold.

In some aspects, the techniques described herein relate to a device, the operations further including calculating a coverage value based on a comparison of the third number of load instructions to the second number of load instructions, the lookup being performed based on the coverage value satisfying a threshold.

In some aspects, the techniques described herein relate to a device, the operations further including calculating an accuracy value based on a comparison of the third number of load instructions to the first number of load instructions, the lookup being performed based on the accuracy value satisfying a threshold.

In some aspects, the techniques described herein relate to a method, comprising receiving, by a processor, a load instruction instructing the processor to load data associated with an address, predicting, by the processor, whether the load instruction accesses a zero value cache line based on previously accessed zero value cache lines, generating, by the processor, zero value data based on the load instruction being predicted to access a zero value cache line, the generated zero value data being used by the processor to process one or more dependent instructions, and retrieving, by the processor, a cache line from memory of the processor based on the load instruction being predicted to access a cache line having non-zero values, the retrieved cache line being used by the processor to process the one or more dependent instructions.

In some aspects, the techniques described herein relate to a system, comprising a memory system including a volatile memory and a non-volatile memory, and a processor including a cache system, the processor configured to implement a speculative load policy by which dependent instructions that depend on load instructions predicted to access zero value cache lines are processed using zero values, and transition to a baseline load policy by which the load instructions are processed based on retrieval of cache lines from the cache system or the memory system, the baseline load policy transitioned to based on one or more performance metrics associated with the speculative load policy.

In some aspects, the techniques described herein relate to a system, wherein to implement the speculative load policy, the processor processes the dependent instructions of a respective load instruction associated with an address based on a hash of the address being present in a bloom filter that tracks zero value cache lines that have previously been accessed.

In some aspects, the techniques described herein relate to a system, wherein the one or more performance metrics are evaluated against one or more performance thresholds for transitioning to the baseline load policy periodically after phases of a predefined number of load instructions are processed.

In some aspects, the techniques described herein relate to a system, wherein to transition to the baseline load policy, the processor is configured to reset the bloom filter based on the one or more performance metrics falling below the one or more performance thresholds responsive to a first successive phase of the predefined number of load instructions being processed, and transition to the baseline load policy based on the one or more performance metrics falling below the one or more performance thresholds responsive to a second successive phase of the predefined number of load instructions being processed.

In some aspects, the techniques described herein relate to a system, wherein the one or more performance metrics include an accuracy value based on a comparison of a first number of load instructions correctly predicted to access zero value cache lines to a second number of load instructions predicted to access zero value cache lines, a coverage value based on a comparison of the first number of load instructions to a third number of load instructions that have accessed zero value cache lines, and an opportunity value based on a comparison of the third number of load instructions to a fourth number of total load instructions received.

In some aspects, the techniques described herein relate to a system, wherein the processor is configured to implement the speculative load policy based on the accuracy value satisfying an accuracy threshold, the coverage value satisfying a coverage threshold, and the opportunity value satisfying an opportunity threshold.

In some aspects, the techniques described herein relate to a system, wherein the processor is configured to transition to the baseline load policy based on at least one of the accuracy value falling below an accuracy threshold, the coverage value falling below a coverage threshold, and the opportunity value falling below an opportunity threshold.

FIG. 1 is a block diagram of a non-limiting example system 100 to implement techniques for queue management for task graphs. The system 100 includes a device 102 having a processor 104, and a memory system 106 having a volatile memory 108 and a non-volatile memory 110. The device 102 is configurable in a variety of ways. Examples of which include, by way of example and not limitation, computing devices, servers, mobile devices (e.g., wearables, mobile phones, tablets, laptops), processors (e.g., graphics processing units, central processing units, and accelerators), digital signal processors, disk array controllers, hard disk drive host adapters, memory cards, solid-state drives, wireless communications hardware connections, Ethernet hardware connections, switches, bridges, network interface controllers, and other apparatus configurations. It is to be appreciated that in various implementations, the device 102 is configured as any one or more of those devices listed just above and/or a variety of other devices without departing from the spirit or scope of the described techniques.

In accordance with the described techniques, the processor 104 and the memory system 106 are coupled to one another via one or more wired and/or wireless connections. Example wired connections include, but are not limited to, buses (e.g., a data bus), interconnects, traces, and planes. The processor 104 is an electronic circuit that reads, translates, and executes instructions of a program, application, and/or operating system. Examples of the processor 104 include, but are not limited to, a central processing unit (CPU), a graphics processing unit (GPU), a field programmable gate array (FPGA), a digital signal processor (DSP), an application specific integrated circuit (ASIC), or any other type of integrated circuit.

The volatile memory 108 and the non-volatile memory 110 are devices and/or systems that are used to store information, such as for use by the processor 104. Broadly, the volatile memory 108 retains data as long as the device 102 is connected to power, and the data is accessible relatively faster than the non-volatile memory 110. Examples of the volatile memory 108 include random-access memory (RAM), dynamic random-access memory (DRAM), synchronous dynamic random-access memory (SDRAM), and static random-access memory (SRAM). Further, the non-volatile memory 110 retains data even after the device 102 is disconnected from power, but is accessible relatively slower than the volatile memory 108. Examples of the non-volatile memory include solid state disks (SSD), flash memory, read-only memory (ROM), programmable read-only memory (PROM), erasable programmable read-only memory (EPROM), and electronically erasable programmable read-only memory (EEPROM).

As shown, the processor 104 includes one or more execution units 112, one or more load-store units 114, and a cache system 116 that are coupled to one another via one or more wired and/or wireless connections. Broadly, an execution unit 112 is a hardware component that corresponds to or includes hardware circuitry of the processor 104 configured to perform specific types of operations, such as arithmetic and logic operations. Further, a load-store unit 114 is a hardware component that corresponds to or includes hardware circuitry of the processor 104 configured to perform load operations and store operations. By way of example, the processor 104 corresponds to an integrated circuit, and the execution units 112 and the load-store units are implemented in the integrated circuit.

More specifically, the execution units 112 and the load-store units 114 perform respective operations based on instructions received through execution of system software (e.g., applications, programs, and/or operating systems). By way of example, the system software is embodied in instructions (i.e., program code) stored in the memory system 106. To execute the system software, a control unit (not depicted) of the processor 104 receives the instructions from the memory system 106, decodes the instructions, and forwards the instructions to the execution units 112 and/or the load-store units 114.

Load instructions instruct the load-store units 114 to load data from the cache system 116, the volatile memory 108, and/or the non-volatile memory 110 into registers 118 of the one or more execution units 112. Once loaded into the registers 118, instructions (e.g., arithmetic and logic instructions) are executable by the execution units 112 to perform corresponding operations (e.g., arithmetic and logic operations) on the data that is present in the registers 118. Store instructions instruct the load-store units 114 to store data from the registers 118 (e.g., after the data has been processed by the execution units 112) back to the cache system 116, the volatile memory 108, and/or the non-volatile memory 110. Notably, information is communicated between the various hardware elements of the device 102 (e.g., between the execution units 112, the load-store units 114, the cache system 116, and the memory system 106) in fixed-length units of data transfer called "cache lines."

As shown, the cache system 116 includes multiple cache levels 120, examples of which are illustrated as a level 1 cache 122, through a level "N" cache 124. By way of example and not limitation, the processor 104 is a multi-core processor, and each respective core includes a level 1 cache and a level 2 cache that are native to a respective core. Continuing with this example, the processor 104 includes a level 3 cache that is shared among all cores of the processor 104. In general, data stored in higher level caches (e.g., the level 1 cache) is accessible relatively faster than data stored in lower level caches (e.g., the level 3 cache), but the lower level caches have increased memory capacity than the higher level caches. Moreover, data stored in the cache system 116 is accessible relatively faster than data stored in the volatile memory 108, and data stored in the volatile memory 108 is accessible relatively faster than data stored in the non-volatile memory 110. It is to be appreciated that the processor 104 can include cache systems with differing numbers of caches and different hierarchical structures without departing from the spirit or scope of the described techniques.

Given the above, the load-store unit 114 executes a load instruction by progressively checking the cache system 116 (from higher level caches to lower level caches), then the volatile memory 108, and then the non-volatile memory 110 for data that is the subject of a load instruction. This process is referred to herein as a "baseline lookup protocol."

As an example of the baseline lookup protocol, the load-store unit 114 receives a load instruction that includes an address, and in response, the load-store unit 114 performs a lookup for the address in successive cache levels 120, e.g., the level 1 cache, then the level 2 cache, and so on. In cache operations, a "cache hit" occurs at a cache level 120 when a tag of the address is present in the cache level 120. In contrast, a "cache miss" occurs at a cache level 120 when a tag of the address is absent from the cache level. Notably, a tag of an address being present in a cache level 120 means that a cache line storing the data specified by the address is also present in the cache level. Given this, the load-store unit 114 loads the data from a cache level 120 in response to the lookup resulting in a cache hit.

Continuing with the previous example of the baseline lookup protocol, the load-store unit 114 proceeds to look up the address in the volatile memory 108 in response to the lookup resulting in a cache miss in each cache level 120 of the cache system 116. If the data identified by the address is present in the volatile memory 108, the load-store unit 114 loads the data from the volatile memory 108. Otherwise, the load-store unit 114 performs a lookup for the data identified by the address in the non-volatile memory 110, and loads the data from the non-volatile memory 110.

Certain applications, such as graph analytics applications, frequently read zero values from memory, e.g., the cache system 116 and the memory system 106. That is, these applications often access zero value cache lines, e.g., cache lines having all zero values. Further, these applications often repeatedly access a same cache line via multiple repeated load instructions to a particular address. Once a particular address is known to contain a zero value cache line, future load instructions to the particular address will similarly return zero values until a non-zero value is written to the cache line.

Despite frequent repeated accesses to zero value cache lines, conventional memory access techniques rely on loading cache lines (e.g., from the cache system 116 or the memory system 106) into the core of the processor 104 before determining that the cache lines are zero value cache lines. Accordingly, conventionally-configured processors stall the processing of dependent instructions that depend on zero value cache lines until the zero value cache lines are loaded into the core in accordance with the baseline lookup protocol. Therefore, conventional memory access techniques incur significant data load latency in loading previously accessed zero cache lines that likely still include solely zero values. The data load latency is further exacerbated in situations in which the zero value cache lines are accessed from memory resources (e.g., lower cache levels 120 and the memory system 106) that are further from the core of the processor 104 in terms of data communication pathways.

To alleviate data load latency for repeated accesses to zero value cache lines, techniques are described herein for zero value memory access optimization. As shown, each cache level 120 is modified to include a zero cache 126. By way of example, each cache level 120 of the cache system 116 is an n-way set associative cache including a tag array and a data array. The tag array includes tags that map to cache lines in the data array. In accordance with n-way set associative caches, the tag array and the data array are partitioned into a number "n" of sets. To lookup an address in a cache level 120, an index of the address is used to identify a set of the tag array, and a tag of the address is used to identify a tag within the set that maps to a cache line in the data array. Further, an offset of the address is used to identify a portion of data in the cache line.

In accordance with the described techniques, each cache level 120 is modified to include one or more additional sets in the tag array, and the one or more additional sets in the tag array include tags that identify zero value cache lines. By way of example, each cache level 120 includes a number "n" of sets in the data array, and a number "n+z" sets in the tag array. Here, the one or more additional sets (or the "z" sets) in the tag array correspond to the zero cache 126 of a cache level 120, while the "n" sets of the tag array and the data array correspond to a non-zero cache of the cache level 120.

Additionally or alternatively, each cache level 120 includes a non-zero cache structure including a tag array and a data array that stores cache lines having non-zero values. In addition, each cache level includes a separate zero cache structure including solely a tag array that includes tags that identify zero value cache lines. By way of example, each cache level 120 of the cache system 116 includes a non-zero cache (e.g., including a tag array and a data array each having "n" sets) and a parallel zero cache 126, e.g., including solely a tag array having one or more sets. Regardless of how the zero cache 126 and the non-zero cache are structured, the zero caches 126 and the non-zero caches are exclusive, e.g., a cache line represented in a zero cache 126 is excluded from representation in a non-zero cache, and vice versa.

In summary, zero caches 126 include tags that identify zero value cache lines. The zero value cache lines identified by the tags, however, are not stored in the zero caches 126 because the zero value cache lines are known to include solely zero values, thereby conserving storage capacity in the cache system 116. Further, non-zero caches include tags that identify cache lines having non-zero values, as well as the cache lines identified by the tags. In one example, a zero cache 126 is included as part of a tag array that also includes sets of a non-zero cache. Additionally or alternatively, a zero cache 126 is part of a tag array that is separate from the non-zero caches.

Given the above, when a load instruction associated with an address is received by a load-store unit 114, and the address identifies a tag in the zero cache 126, the load-store unit 114 determines that the load instruction accesses a zero value cache line. In response to a non-zero value being written to a first cache line included in the zero cache 126, the tag identifying the first cache line is evicted from the zero cache 126. Furthermore, a second cache line is evicted from the non-zero cache in accordance with an eviction policy (e.g., least recently accessed, least frequently used, etc.), and replaced with the first cache line that now includes at least one non-zero value.

In one or more implementations, the first cache line is elevated to a higher cache level 120 based on the first cache line including temporal data, e.g., data that is to be reused within a certain number of processor cycles. By way of example, the first cache line is initially present in the zero cache 126 of a level 3 cache and is elevated to the non-zero cache of the level 1 cache based on a non-zero value being written to the first cache line, and the first cache line including temporal data. In contrast, the first cache line is not elevated to a higher cache level 120 based on the first cache line including non-temporal data, e.g., data that will not be reused within a certain number of processor cycles. In an example, the first cache line is initially present in the zero cache 126 of a level 3 cache and is moved to the non-zero cache of the level 3 cache based on a non-zero value being written to the first cache line and the first cache line including non-temporal data.

Notably, the cache levels 120 do not store data (e.g., the zero values) of the zero value cache lines in the data array. Instead, the load-store unit 114 determines that an address identifies a zero value cache line based on the address identifying a tag in the zero cache 126. Since zero value cache lines (e.g., containing, for example, sixty-four bytes of zero values) are not stored in the data array, the described techniques increase cache capacity in the cache system 116. By doing so, the described techniques also increase cache hit rate, which reduces communication overhead and improves overall computational efficiency for the device 102.

As shown, the load-store units 114 include zero filtering logic 128 configured to predict whether a received load instruction accesses a zero value cache line. An example of the zero filtering logic 128 is illustrated as including a first bloom filter 130 and a second bloom filter 132. Broadly, a bloom filter is a probabilistic data structure that is used to test whether an element is a member of a set. Bloom filters achieve space efficiency by way of including hashes (e.g., generated using a hashing function) of elements, rather than the elements themselves, in the bloom filters. In general, a query input to a bloom filter returns a result of "possibly in the set," or "definitely not in the set." In other words, false positive matches are possible for bloom filters, but false negative matches are not possible for bloom filters.

In accordance with the described techniques, the first bloom filter 130 includes hashes of addresses to cache lines (e.g., cache lines including non-zero values as well as zero value cache lines) that have previously been accessed by the load-store units 114. Further, the second bloom filter 132 includes hashes of addresses to zero value cache lines that have previously been accessed by the load-store units 114.

In response to receiving a load instruction to an address, the load-store unit 114 performs a lookup for the address in the first bloom filter 130 and the second bloom filter 132. As used herein, a "filter hit" occurs in a bloom filter when a hash of the address is present in the bloom filter, indicating that the address is likely present in the bloom filter. In contrast, a "filter miss" occurs in a bloom filter when a hash of the address is absent from the bloom filter, indicating that the address is definitely not in the bloom filter. Based on the lookup resulting in a filter hit in both the first bloom filter 130 and the second bloom filter 132, the zero filtering logic 128 predicts that the load instruction accesses a zero value cache line. In contrast, the zero filtering logic 128 predicts that the load instruction accesses a cache line having non-zero values based on the lookup resulting in a filter miss in at least one of the first bloom filter 130 or the second bloom filter 132.

Given that previously accessed zero value cache lines continue to include solely zero values until a non-zero value is written to the zero value cache lines, a filter hit in the second bloom filter 132 indicates that the address likely identifies a zero value cache line. Further, by filtering the address using the first bloom filter 130 in addition to the second bloom filter 132, the described techniques reduce the likelihood of false positives. In the context of the described techniques, false positives are addresses that are not added to the bloom filters 130, 132, but are nonetheless predicted as included in the bloom filters 130, 132 by the zero filtering logic 128. By way of example, if a lookup of an address results in a filter hit in the second bloom filter 132 based on a false positive, a lookup of the address is likely to result in a filter miss in the first bloom filter 130, thereby causing the zero filtering logic 128 to predict that the address identifies a cache line having non-zero values.

Although the zero filtering logic 128 is depicted and described herein as corresponding to or including the bloom filters 130, 132, it is to be appreciated that the zero filtering logic 128 is implemented differently in variations without departing from the spirit or scope of the described techniques. One alternative example of the zero filtering logic 128 includes a machine learning model. Broadly, a machine learning model is a computer representation that utilizes algorithms to learn from, and make predictions on, known data by analyzing the known data to learn to generate outputs that reflect patterns and attributes of the known data. According to various implementations, the machine learning model uses supervised learning, semi-supervised learning, unsupervised learning, reinforcement learning, and/or transfer learning. For example, the machine learning model is capable of including, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc.

In a specific but non-limiting example, the zero filtering logic 128 includes a machine learning model trained using reinforcement learning to predict whether an address identifies a zero value cache line based on previously accessed zero value cache lines. During training, for instance, the machine learning model is employed to predict whether load instructions access zero value cache lines based on access patterns of previously accessed zero value cache lines of an application. If the model accurately predicts that a respective load instruction accesses a zero value cache line, the machine learning model is positively reinforced. If, however, the machine learning model makes a misprediction, the machine learning model is negatively reinforced. Over many iterations, the machine learning model learns to accurately predict whether a received address identifies a zero value cache line based on the previously accessed zero value cache lines.

Regardless of how the zero filtering logic 128 is implemented, a load-store unit 114 generates zero value data responsive to predicting that the load instruction accesses a zero value cache line. Furthermore, the load-store unit 114 loads the zero value data into the registers 118 of an execution unit 112. The execution unit 112 processes one or more dependent instructions that rely on the data of the load instruction using the zero value data that is present in the registers 118, e.g., rather than a cache line obtained from the cache system 116 or the memory system 106 in accordance with the baseline lookup protocol. Responsive to predicting that the load instruction accesses a cache line having non-zero values, however, the load-store unit 114 loads the data in accordance with the baseline lookup protocol.

Thus, in scenarios in which the zero filtering logic 128 accurately predicts that a load instruction accesses a zero value cache line, the described techniques reduce the data load latency associated with loading data of the load instruction using the baseline lookup protocol. This is because the dependent instructions are processed speculatively assuming the load instruction accesses zero values before the data of the load instruction is retrieved from the cache system 116 or the memory system 106. The reduction is to a greater degree in situations in which the data is maintained in a lower cache level 120 or the memory system 106. Accordingly, the described techniques improve computational efficiency on the device 102 by speculatively executing the dependent instructions using zero values.

Figure 2:
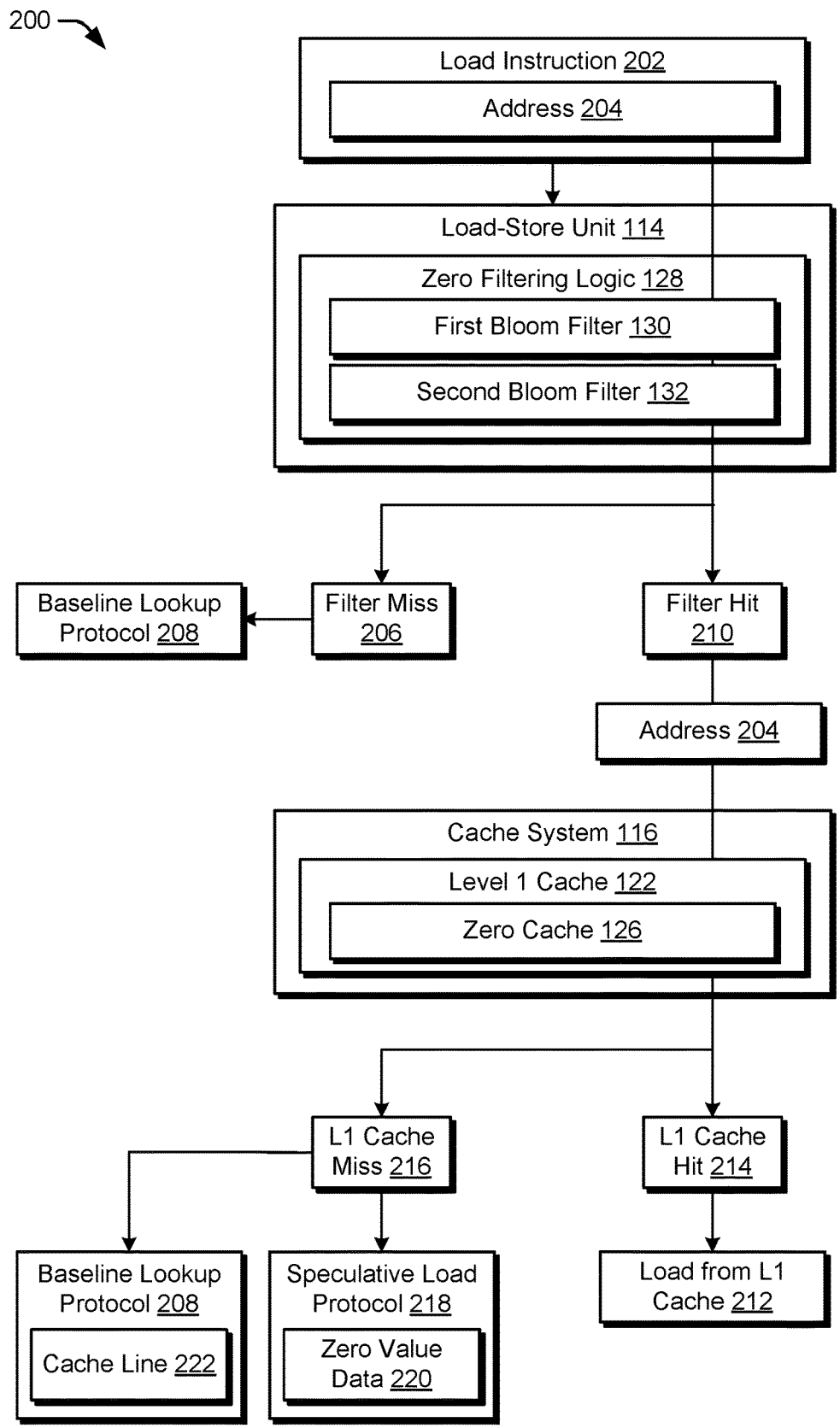
FIG. 2 depicts a non-limiting example in which a load-store unit processes a load instruction in accordance with the described techniques.

FIG. 2 depicts a non-limiting example 200 in which a load-store unit processes a load instruction in accordance with the described techniques. As shown, the example 200 includes the load-store unit 114 and the cache system 116. Further, the load-store unit 114 includes the zero filtering logic 128 having the first bloom filter 130 and the second bloom filter 132. Moreover, the cache system 116 includes the level 1 cache 122 having the zero cache 126 and the non-zero cache (not depicted).

In accordance with the described techniques, the load-store unit 114 receives a load instruction 202 instructing the load-store unit 114 to load data associated with an address 204. In response to receiving the load instruction 202, the load-store unit 114 performs a lookup for the address 204 in the first bloom filter 130 and the second bloom filter 132. A filter miss 206 occurs based on a hash of the address 204 being absent from either the first bloom filter 130 or the second bloom filter 132. Based on the filter miss 206, the load-store unit 114 implements the baseline lookup protocol 208 to load the data associated with the address 204. As part of this, the load-store unit 114 obtains the data from the cache system 116 or the memory system 106 by progressively looking up the address 204 in successive cache levels 120 of the cache system 116, then the volatile memory 108, then the non-volatile memory 110. The load-store unit 114 further loads the obtained data into the registers 118 of an execution unit 112, and the execution unit 112 processes one or more dependent instructions that depend on the data of the load instruction 202 using the obtained data.

In contrast, a filter hit 210 occurs based on a hash of the address 204 being present in both the first bloom filter 130 and the second bloom filter 132. Based on the filter hit 210, the load-store unit 114 performs a lookup for the address 204 in the level 1 cache 122. Furthermore, the load-store unit 114 is configured to load the data from the level 1 cache 122 (depicted as the operation to load from L1 cache 212) responsive to a lookup for the address 204 resulting in a cache hit in the level 1 cache 122 (depicted as the L1 cache hit 214). For example, if the data of the address 204 is present in the non-zero cache of the level 1 cache 122, the load-store unit 114 reads the data from the non-zero cache and loads the data into the registers 118 of an execution unit 112. If the data of the address 204 is present in the zero cache 126 of the level 1 cache 122, however, the load-store unit 114 generates zero value data and loads the zero value data into the registers 118 of an execution unit 112.

Responsive to a lookup for the address 204 resulting in a cache miss in the level 1 cache 122 (depicted as the L1 cache miss 216), the load-store unit 114 implements a speculative load protocol 218. In accordance with the speculative load protocol 218, the load-store unit 114 generates zero value data 220, and loads the zero value data 220 into the registers 118 of an execution unit 112. Further, the execution unit 112 processes one or more dependent instructions that depend on the data of the load instruction 202 using the zero value data 220.

Notably, it is possible for a filter hit 210 to occur for the address 204 even if the cache line identified by the address 204 (e.g., in the cache system 116 or the memory system 106) includes non-zero values. This is referred to herein as a "misprediction," and occurs due to previously accessed zero value cache lines being subsequently modified to include non-zero values and/or false positive filter hits occurring in the bloom filters 130, 132. For this reason, the cache line 222 identified by the address 204 is additionally obtained from the cache system 116 or the memory system 106 using the baseline lookup protocol 208. Further, the load-store unit 114 is configured to instruct the execution unit 112 to re-process the one or more dependent instructions based on the cache line 222 obtained using the baseline lookup protocol 208 including non-zero values.

By way of example, if the cache line 222 is obtained from a zero cache 126 of the cache system 116, the load-store unit 114 determines that the cache line 222 is a zero value cache line. Given this, the load-store unit 114 does not instruct the execution unit 112 to re-process the one or more dependent instructions since the dependent instructions were accurately processed using zero values.

Consider, in contrast, that the cache line 222 is obtained from a non-zero cache of the cache system 116 or the memory system 106, e.g., the cache line 222 potentially includes non-zero values. In this example implementation, the load-store unit 114 determines whether a portion of the cache line 222 that is used to process the dependent instructions includes non-zero values. The load-store unit 114 does not instruct the execution unit 112 to re-process the dependent instructions if the portion of the cache line 222 that is used to process the dependent instructions includes solely zero values. This is true even if the remainder of the cache line 222 includes non-zero values because these non-zero values did not impact the dependent instructions, and as such, the dependent instructions will still have produced accurate results. However, the load-store unit 114 instructs the execution unit 112 to re-process the dependent instructions using the cache line 222, rather than the zero value data 220 if the portion of the cache line 222 that is used to process the dependent instructions includes non-zero values.

Responsive to determining that the cache line 222 includes non-zero values (and regardless of whether the portion of the cache line 222 relied on by the dependent instructions includes solely zero values), the load-store unit 114 is configured to delete the hash of address 204 to the cache line 222 from the second bloom filter 132. By doing so, the described techniques reduce the likelihood of a subsequent load instruction to the address 204 being inaccurately predicted to access a zero value cache line. To enable this functionality, the bloom filters 130, 132 are implemented as counting bloom filters having counting bins for each hash of an address in the bloom filters 130, 132. To "delete" the hash of the address 204 to the cache line 222, the load-store unit 114 decrements the counting bin associated with the address 204 to zero.

By re-processing the dependent instructions using the cache line 222 obtained using the baseline lookup protocol 208, the described techniques recover from mispredictions by the zero filtering logic 128. Notably, the recovery process is expensive as it involves voiding previously executed instructions, and re-executing the previously executed instructions using different data. It is for this reason that the load-store unit 114 performs a lookup for the address 204 in the level 1 cache 122 responsive to the filter hit 210, rather than immediately implementing the speculative load protocol 218.

Indeed, a lookup in the level 1 cache 122 is performable in significantly fewer processor cycles than the above-described recovery process. Thus, in scenarios in which the load instruction 202 is inaccurately predicted to access a zero value cache line and the address 204 is present in the level 1 cache 122, the described techniques avoid the extra processor cycles associated with the recovery process. Further, in scenarios in which the load instruction 202 is accurately predicted to access a zero value cache line and the address 204 is present in the zero cache 126 of the level 1 cache 122, the described techniques solely incur the extra processor cycles of the lookup in the level 1 cache 122, which is insubstantial in comparison to the recovery process.

Figure 3:
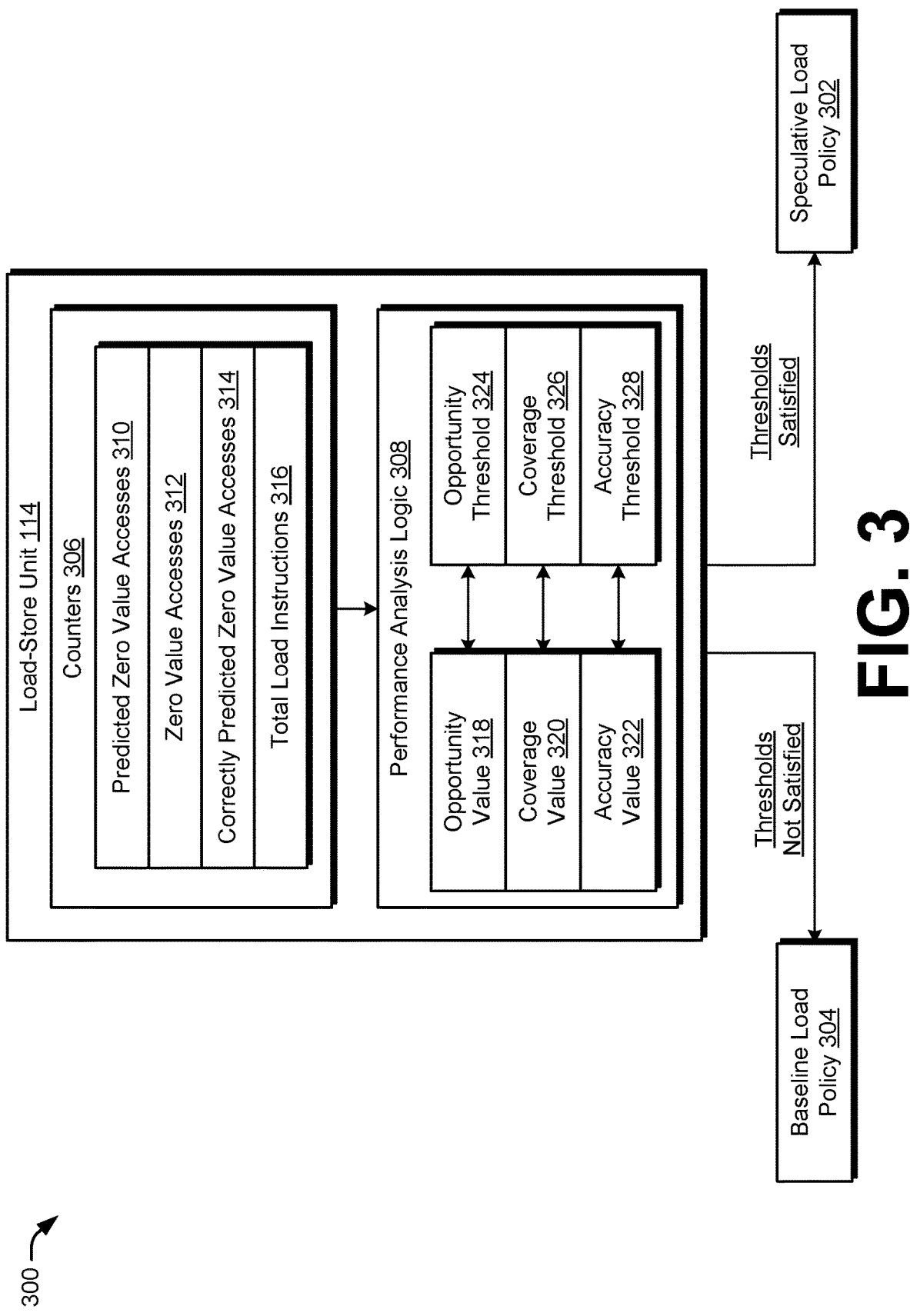
FIG. 3 depicts a non-limiting example in which a load-store unit transitions from a speculative load policy to a baseline load policy

FIG. 3 depicts a non-limiting example 300 in which a load-store unit transitions from a speculative load policy to a baseline load policy. In the example 300, the speculative load policy 302 involves processing load instructions in accordance with the techniques discussed above with reference to FIG. 2. By way of example, a load instruction is processed in accordance with the speculative load policy 302, in part, by predicting whether a load instruction accesses a zero value cache line using the bloom filters 130, 132, and loading the data of the load instruction in accordance with the speculative load protocol 218 or the baseline lookup protocol 208 based on the prediction.

The speculative load policy 302 differs from the speculative load protocol 218 in that the speculative load protocol 218 defines how a single load instruction is processed. In contrast, the speculative load policy 302 defines a process for determining whether the speculative load protocol 218 should be implemented for all received load instructions. Indeed, a load instruction processed in accordance with the speculative load policy 302 is capable of being processed using the baseline lookup protocol 208, e.g., if the load instruction is predicted to access a cache line including non-zero values by the zero filtering logic 128. The baseline load policy 304 involves processing each load instruction in accordance with the baseline lookup protocol 208.

As shown, the load-store unit 114 maintains one or more counters 306 that track performance metrics indicating whether implementation of the speculative load policy 302 is improving computer performance. Values of the counters 306 are provided periodically to performance analysis logic 308 after each successive phase of a predefined number of load instructions are processed. For example, the values of the counters 306 are read by the performance analysis logic 308 every "n" number of load instructions. Broadly, the performance analysis logic 308 analyzes the values of the counters 306 to determine whether the speculative load policy 302 is improving computer performance, and if not, the load-store unit 114 transitions to implementing the baseline load policy 304.

In particular, the load-store unit 114 maintains a first counter 306 that tracks a number of predicted zero value accesses 310. The first counter 306 is incremented (e.g., by one) each time a load instruction is predicted to access a zero value cache line, e.g., each time a load instruction results in a filter hit 210 in the bloom filters 130, 132. Notably, the first counter 306 is incremented regardless of whether the load instruction, in fact, accesses a zero value cache line in memory.

Moreover, the load-store unit 114 maintains a second counter 306 that tracks a number of zero value accesses 312. The second counter 306 is incremented (e.g., by one) each time a load instruction accesses a zero value cache line in memory, regardless of whether it is predicted to do so. Thus, the second counter 306 is incremented in the following scenarios: (1) a load instruction results in a filter miss 206 and the baseline lookup protocol 208 returns a zero value cache line, (2) a load instruction results in a filter hit 210, while the subsequent lookup in the level 1 cache 122 results in a cache hit and returns a zero value cache line, and (3) a load instruction results in a filter hit 210, while the subsequent lookup in the level 1 cache results in a cache miss, and the cache line 222 retrieved as part of the baseline lookup protocol 208 returns a zero value cache line.

Furthermore, the load-store unit 114 maintains a third counter 306 that tracks correctly predicted zero value accesses 314. The third counter 306 is incremented (e.g., by one) each time a load instruction is predicted to access a zero value cache line, and the load instruction, in fact, accesses a zero value cache line in memory. Thus, the third counter 306 is incremented in the following scenarios: (1) a load instruction results in a filter hit 210, while the subsequent lookup in the level 1 cache 122 results in a cache hit and returns a zero value cache line, and (2) a load instruction results in a filter hit 210, while the subsequent lookup in the level 1 cache 122 results in a cache miss, and the cache line 222 retrieved as part of the baseline lookup protocol 208 returns a zero value cache line.

Lastly, the load-store unit 114 maintains a fourth counter 306 of total load instructions received. The fourth counter 306 is incremented (e.g., by one) for each load instruction that is received, i.e., regardless of whether the load instruction is processed using the baseline lookup protocol 208 or the speculative load protocol 218. It should be noted that, in variations, the counters 306 are reset (e.g., to zero) after each successive phase of the predefined number of load instructions are processed. Alternatively, the counters 306 continue to increment from previous phases of load instructions.

In accordance with the described techniques, the values of the counters 306 are read by the performance analysis logic 308 after a phase of the predefined number of load instructions are processed. Further, the performance analysis logic 308 calculates an opportunity value 318 as a ratio of the value of the second counter 306 (e.g., the zero value accesses 312) to the value of the fourth counter 306, e.g., the total load instructions 316. Further, the performance analysis logic 308 calculates a coverage value 320 as a ratio of the value of the third counter 306 (e.g., the correctly predicted zero value accesses 314) to the second counter 306, e.g., the zero value accesses 312. In addition, the performance analysis logic 308 calculates an accuracy value 322 as a ratio of the value of the third counter 306 (e.g., the correctly predicted zero value accesses 314) to the value of the first counter 306, e.g., the predicted zero value accesses.

As shown, the performance analysis logic 308 compares the opportunity value 318 to an opportunity threshold 324, and the performance analysis logic 308 also compares the coverage value 320 to a coverage threshold 326. A low opportunity value 318 means that the system software (e.g., program, application, or operating system) infrequently accesses zero value cache lines. Further, a low coverage value means that the zero filtering logic 128 frequently fails to predict that load instructions access zero value cache lines, despite the load instructions, in fact, accessing zero value cache lines in memory.

Notably, the speculative load policy 302 consumes more energy than the baseline load policy 304 due to the extra lookups in the bloom filters 130, 132. Given this, if the opportunity value 318 falls below the opportunity threshold 324 or if the coverage value 320 falls below the coverage threshold 326, it is more beneficial for overall computer performance to implement the baseline load policy 304 due to the reduced energy consumption. Accordingly, the load-store unit 114 transitions from implementing the speculative load policy 302 to implementing the baseline load policy 304 responsive to the opportunity value 318 being below the opportunity threshold 324 or the coverage value 320 being below the coverage threshold 326.

Furthermore, the performance analysis logic 308 compares the accuracy value 322 to an accuracy threshold 328. A low accuracy value means that the zero filtering logic 128 is frequently making mispredictions, and as such, the load-store unit 114 is frequently performing the above-described recovery process. As previously mentioned, the recovery process is expensive as it involves voiding previously executed instructions, and re-executing the previously executed instructions using different data. Thus, if the accuracy value 322 is below the accuracy threshold 328, it is more beneficial for overall computer performance to implement the baseline load policy 304 due to the avoidance of extra processor cycles spent performing the recovery process.

Given the above, if the accuracy value 322 falls below the accuracy threshold 328, the load-store unit 114 resets/clears the bloom filters 130, 132, and continues to implement the speculative load policy 302. Further, the accuracy value 322 is again evaluated against the accuracy threshold 328 after a next successive phase of the predefined number of load instructions have been executed. If the accuracy value 322 is above the accuracy threshold 328 after the next successive phase of load instructions has been executed, the speculative load policy 302 continues to be implemented. In contrast, the load-store unit 114 transitions from implementing the speculative load policy 302 to implementing the baseline load policy 304 based on the accuracy value 322 remaining below the accuracy threshold 328 after the next successive phase of load instructions has been executed.

In sum, the load-store unit 114 transitions from implementing the speculative load policy 302 to implementing the baseline load policy 304 if at least one of the following occurs: (1) the opportunity value 318 falls below the opportunity threshold 324 after a respective phase of "n" load instructions, (2) the coverage value 320 falls below the coverage threshold 326 after a respective phase of "n" load instructions, (3) or the accuracy value 322 falls below the accuracy threshold 328 after two successive phases of "n" load instructions.

In various scenarios, the bloom filters 130, 132 include stale data. For example, the bloom filters 130, 132 indicate that an address accesses a zero value cache line despite the cache line having been subsequently modified to include non-zero values. It is for this reason that the bloom filters 130, 132 are reset and the accuracy value 322 is re-evaluated against the accuracy threshold 328 after a next successive phase of load instructions are executed. By doing so, the described techniques remove the data from the bloom filters 130, 132 to determine whether the mispredictions are a result of stale data in the bloom filters 130, 132 or a result of frequent false positive matches. In the case of frequent false positive matches, the accuracy value 322 remains below the accuracy threshold 328, and the speculative load policy 302 is disabled.

Figure 4:
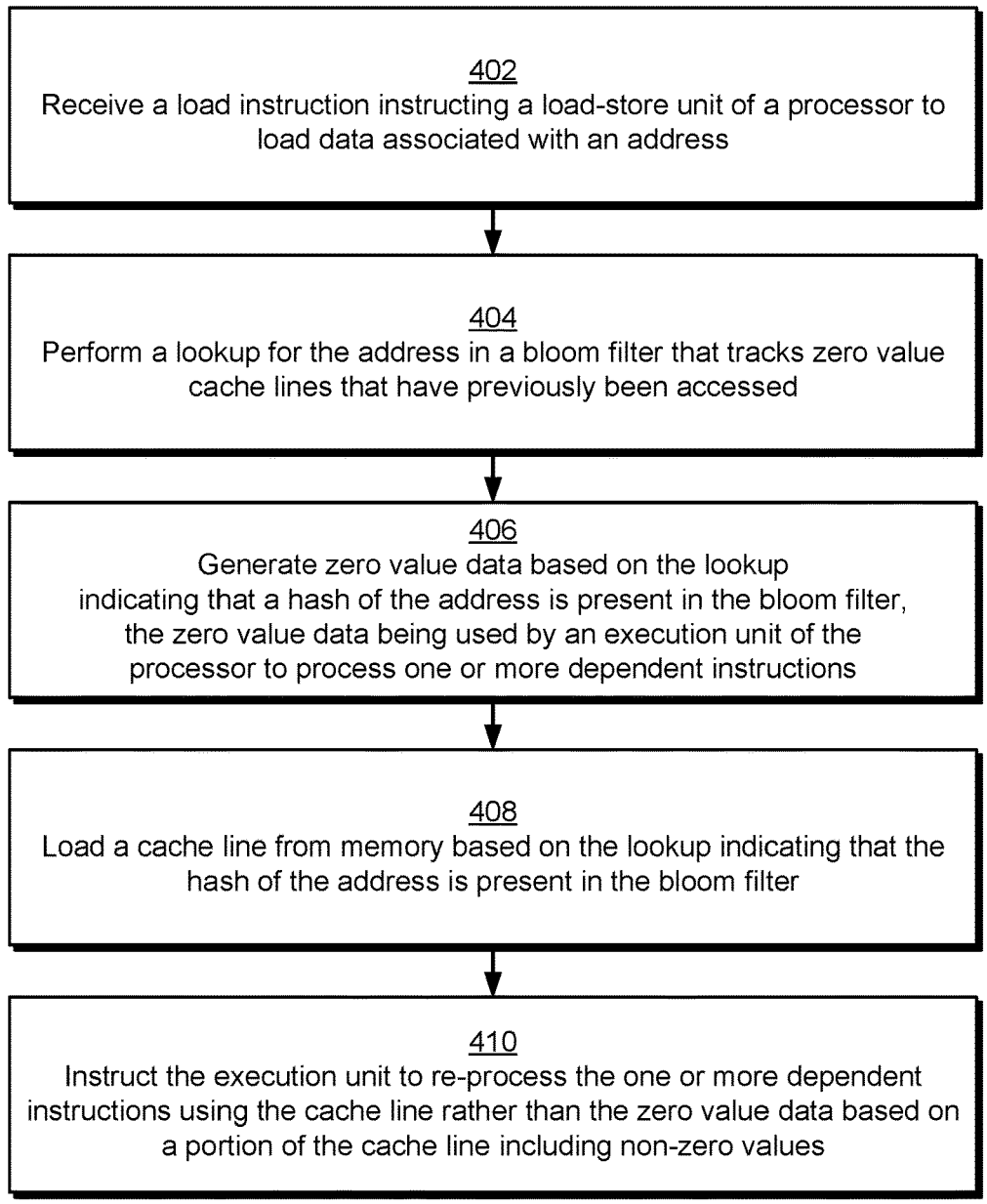
FIG. 4 depicts a procedure in an example implementation of zero value memory access optimization.

FIG. 4 depicts a procedure 400 in an example implementation of zero value memory access optimization. In the procedure 400, a load instruction is received instructing a load-store unit of a processor to load data associated with an address (block 402). By way of example, the load-store unit 114 of the processor 104 receives the load instruction 202 instructing the load-store unit 114 to load data associated with the address 204.

A lookup is performed for the address in a bloom filter that tracks zero value cache lines that have previously been accessed (block 404). For example, the load-store unit 114 inputs the address 204 into the bloom filters 130, 132. The first bloom filter 130 includes hashes of addresses that map to cache lines that have previously been accessed, and the second bloom filter 132 includes hashes of addresses that map to zero value cache lines that have previously been accessed.

Zero value data is generated based on the lookup indicating that a hash of the address is present in the bloom filter, the zero value data being used by an execution unit of the processor to process one or more dependent instructions (block 406). Responsive to a filter hit 210 (e.g., a hash of the address 204 is present in both bloom filters 130, 132), a further lookup is performed for the address 204 in the level 1 cache 122 of the cache system 116. Responsive to a cache miss in the level 1 cache 122, the load-store unit 114 implements the speculative load protocol 218. As part of this, the load-store unit 114 generates the zero value data 220, and loads the zero value data 220 into the registers 118 of the execution unit 112. Further, the execution unit 112 processes one or more dependent instructions that rely on the data of the load instruction 202 using the zero value data 220.

A cache line is loaded from memory based on the lookup indicating that the hash of the address is present in the bloom filter (block 408). Responsive to the filter hit 210 and the subsequent cache miss in the level 1 cache 122, the load-store unit 114 additionally (and concurrently with the speculative load protocol 218) initiates the baseline lookup protocol 208 to load the cache line 222 associated with the address 204 from the cache system 116 or the memory system 106.

The execution unit is instructed to re-process the one or more dependent instructions using the cache line rather than the zero value data based on a portion of the cache line including the non-zero values (block 410). By way of example, solely a portion of the cache line 222 loaded from memory is configured for use in processing the one or more dependent instructions. Given this, the load-store unit 114 analyzes the cache line 222 to determine whether the portion of the cache line 222 that is relied on by the one or more dependent instructions includes non-zero values. Based on the portion of the cache line 222 solely including zero values (e.g., even if the remainder of the cache line includes non-zero values), the load-store unit 114 does not instruct the execution unit 112 to re-process the one or more dependent instructions. In contrast, the execution unit 112 is instructed to re-process the one or more dependent instructions based on the portion of the cache line 222 including non-zero values.

FIG. 5 depicts a procedure 500 in an example implementation of zero value memory access optimization. In the procedure 500, a speculative load policy is implemented by which dependent instructions that depend on load instructions predicted to access zero value cache lines are processed using zero values (block 502). By way of example, the load-store unit 114 implements the speculative load policy 302. In accordance with the speculative load policy 302, the load-store unit 114 processes a respective load instruction by predicting whether the load instruction accesses a zero value cache line using the zero filtering logic 128. Based, in part, on a prediction that the respective load instruction accesses a zero value cache line, the speculative load policy 302 indicates to process the respective load instruction using the speculative load protocol 218. Based on a prediction that the respective load instruction accesses a cache line having non-zero values, the speculative load policy 302 indicates to process the respective load instruction using the baseline lookup protocol 208.

A baseline load policy is transitioned to based on one or more of an opportunity value falling below an opportunity threshold, a coverage value falling below a coverage threshold, and an accuracy value falling below an accuracy threshold, the baseline load policy indicating that load instructions are processed based on retrieval of cache lines from memory (block 504). By way of example, the performance analysis logic 308 calculates the opportunity value 318 based on a comparison of a number of load instructions that access zero value cache lines in the cache system 116 or the memory system 106 (e.g., the zero value accesses 312) to a number of load instructions received, e.g., the total load instructions 316. Further, the performance analysis logic 308 calculates the coverage value 320 based on a comparison of a number of load instructions correctly predicted to access zero value cache lines (e.g., the correctly predicted zero value accesses 314) to a number of load instructions that access zero value cache lines in memory, e.g., the zero value accesses 312. In addition, the performance analysis logic 308 calculates the accuracy value 322 based on a comparison of a number of load instructions correctly predicted to access zero value cache lines (e.g., the correctly predicted zero value accesses 314) to a number of load instructions predicted to access zero value cache lines, e.g., the predicted zero value accesses 310. Further, the load-store unit 114 transitions from implementing the speculative load policy 302 to implementing the baseline load policy 304 if at least one of the following occurs: (1) the opportunity value 318 falls below the opportunity threshold 324, (2) the coverage value 320 falls below the coverage threshold 326, (3) or the accuracy value 322 falls below the accuracy threshold 328 after two successive phases of successively evaluated load instructions.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the device 102, the processor 104, the memory system 106 having the volatile memory 108 and the non-volatile memory 110, the execution units 112, the load-store units 114, the cache system 116, the zero filtering logic 128, the counters 306, and the performance analysis logic 308) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A device, comprising:
a memory system; and
a processor communicatively coupled to the memory system, the processor including a cache system and configured to perform operations, including:
receiving a load instruction from the memory system instructing the processor to load data associated with an address;
performing a lookup for the address in a bloom filter that tracks zero value cache lines that have previously been accessed; and
generating zero value data before the data associated with the address is retrieved from the cache system or the memory system based on the lookup indicating that a hash of the address is present in the bloom filter, the zero value data being used by the processor to process one or more dependent instructions.

2. The device of claim 1, wherein each cache level includes a non-zero cache storing cache lines that include non-zero values, and a zero cache storing indications of the zero value cache lines.

3. The device of claim 1, wherein generating the zero value data includes:

performing an additional lookup for the address in a first cache level of the cache system based on the address being present in the bloom filter; and
generating the zero value data based on the hash of the address being present in the bloom filter and a tag of the address being absent from the first cache level.

4. The device of claim 1, the operations further including:
performing an additional lookup for the address in a first cache level of the cache system based on the address being present in the bloom filter; and
loading a cache line from the first cache level based on the hash of the address being present in the bloom filter and a tag of the address being present in the first cache level, the cache line being used by the processor to process the one or more dependent instructions.

5. The device of claim 1, the operations further including loading a cache line from the cache system or the memory system based on the hash of the address being absent from the bloom filter, the cache line being used by the processor to process the one or more dependent instructions.

6. The device of claim 1, the operations further including performing an additional lookup for the address in an additional bloom filter that tracks cache lines that have previously been accessed, the zero value data being generated based on the lookup indicating that the hash of the address is present in the bloom filter and the additional lookup indicating that the hash of the address is present in the additional bloom filter.

7. The device of claim 1, wherein the zero value data is generated before the data is retrieved from the cache system or the memory system as part of processing the load instruction.

8. The device of claim 1, the operations further including:
loading a cache line from the cache system or the memory system based on the hash of the address being present in the bloom filter; and
re-processing the one or more dependent instructions using the cache line rather than the zero value data based on a portion of the cache line including non-zero values.

9. The device of claim 8, the operations further including deleting an indication of the cache line from the bloom filter based on the cache line including non-zero values.

10. The device of claim 1, the operations further including:
maintaining a first counter of a first number of load instructions that are predicted as accessing the zero value cache lines based on the bloom filter;
maintaining a second counter of a second number of load instructions that have accessed the zero value cache lines in memory; and
maintaining a third counter of a third number of load instructions that are correctly predicted as accessing the zero value cache lines based on the bloom filter.

11. The device of claim 10, the operations further including calculating an opportunity value based on a comparison of the second number of load instructions to a total number of load instructions received, the lookup being performed based on the opportunity value satisfying a threshold.

12. The device of claim 10, the operations further including calculating a coverage value based on a comparison of the third number of load instructions to the second number of load instructions, the lookup being performed based on the coverage value satisfying a threshold.

13. The device of claim 10, the operations further including calculating an accuracy value based on a comparison of the third number of load instructions to the first number of load instructions, the lookup being performed based on the accuracy value satisfying a threshold.

14. A method, comprising:
   receiving, by a processor, a load instruction instructing the processor to load data associated with an address;
   predicting, by the processor, whether the load instruction accesses a zero value cache line based on previously accessed zero value cache lines;
   generating, by the processor, zero value data before the data associated with the address is retrieved from memory based on the load instruction being predicted to access a zero value cache line, the generated zero value data being used by the processor to process one or more dependent instructions; and
   retrieving, by the processor, a cache line from the memory of the processor based on the load instruction being predicted to access a cache line having non-zero values, the retrieved cache line being used by the processor to process the one or more dependent instructions.

15. A system, comprising:
   a memory system including a volatile memory and a non-volatile memory; and
   a processor including a cache system, the processor configured to:
      implement a speculative load policy by which dependent instructions that depend on load instructions predicted to access zero value cache lines are processed using zero values before data addressed by the load instructions is accessed from the cache system or the memory system; and
      transition to a baseline load policy by which the load instructions are processed based on retrieval of cache lines from the cache system or the memory system, the baseline load policy transitioned to based on one or more performance metrics associated with the speculative load policy.

16. The system of claim 15, wherein the one or more performance metrics are evaluated against one or more performance thresholds for transitioning to the baseline load policy periodically after phases of a predefined number of load instructions are processed.

17. The system of claim 16, wherein to transition to the baseline load policy, the processor is configured to:
   reset a bloom filter based on the one or more performance metrics falling below the one or more performance thresholds responsive to a first successive phase of the predefined number of load instructions being processed, the bloom filter implemented by the speculative load policy to predict the zero value cache lines; and
   transition to the baseline load policy based on the one or more performance metrics falling below the one or more performance thresholds responsive to a second successive phase of the predefined number of load instructions being processed.

18. The system of claim 15, wherein the one or more performance metrics include an accuracy value based on a comparison of a first number of load instructions correctly predicted to access zero value cache lines to a second number of load instructions predicted to access zero value cache lines, a coverage value based on a comparison of the first number of load instructions to a third number of load instructions that have accessed zero value cache lines, and an opportunity value based on a comparison of the third number of load instructions to a fourth number of total load instructions received.

19. The system of claim 18, wherein the processor is configured to implement the speculative load policy based on the accuracy value satisfying an accuracy threshold, the coverage value satisfying a coverage threshold, and the opportunity value satisfying an opportunity threshold.

20. The system of claim 18, wherein the processor is configured to transition to the baseline load policy based on at least one of the accuracy value falling below an accuracy threshold, the coverage value falling below a coverage threshold, and the opportunity value falling below an opportunity threshold.

* * * * *